US012649861B2

(12) United States Patent
Hara et al.

(10) Patent No.: US 12,649,861 B2
(45) Date of Patent: Jun. 9, 2026

(54) ACTIVE ENERGY RAY-CURABLE INKJET INK AND IMAGE RECORDING METHOD

(71) Applicant: FUJIFILM CORPORATION, Tokyo (JP)

(72) Inventors: Minako Hara, Kanagawa (JP); Toshiyuki Makuta, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 108 days.

(21) Appl. No.: 18/442,120

(22) Filed: Feb. 15, 2024

(65) Prior Publication Data

US 2024/0182735 A1     Jun. 6, 2024

Related U.S. Application Data

(63) Continuation of application No. PCT/JP2022/027607, filed on Jul. 13, 2022.

(30) Foreign Application Priority Data

Sep. 8, 2021     (JP) ................................. 2021-146365

(51) Int. Cl.
| | |
|---|---|
| *C09D 11/38* | (2014.01) |
| *B41J 2/01* | (2006.01) |
| *B41J 2/21* | (2006.01) |
| *B41J 11/00* | (2006.01) |
| *C09C 1/00* | (2006.01) |
| *C09D 11/101* | (2014.01) |
| *C09D 11/322* | (2014.01) |

(52) U.S. Cl.
CPC ................. *C09D 11/38* (2013.01); *B41J 2/01* (2013.01); *B41J 2/2107* (2013.01); *B41J 2/2114* (2013.01); *B41J 11/0015* (2013.01); *B41J 11/002* (2013.01); *C09C 1/00* (2013.01); *C09D 11/101* (2013.01); *C09D 11/322* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34;

B41J 25/003; B41J 2/18; B41J 25/312; B41J 2025/008; B41J 2202/21; B41J 2/17596; B41J 2/16508; B41J 2/1652; B41J 2/175; B41J 2/17563; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; B41M 5/0011; B41M 5/0017; B41M 5/0023; B41M 5/0047; B41M 7/00; B41M 7/0072; B41M 5/52; B41M 5/5218; B41M 5/5227

See application file for complete search history.

(56) References Cited

U.S. PATENT DOCUMENTS

| | | | |
|---|---|---|---|
| 2008/0213518 A1* | 9/2008 | Oyanagi .............. | C09D 11/324 428/209 |
| 2008/0239043 A1* | 10/2008 | Nakazawa ........... | B41J 11/0021 347/42 |
| 2011/0040014 A1* | 2/2011 | Kim ......................... | C08K 3/08 977/773 |
| 2012/0052261 A1* | 3/2012 | Aoyama .............. | B41M 5/0011 347/20 |

(Continued)

FOREIGN PATENT DOCUMENTS

| | | |
|---|---|---|
| JP | 2016-11426 A | 1/2016 |
| JP | 2020-132998 A | 8/2020 |

(Continued)

OTHER PUBLICATIONS

Extended European Search Report dated Feb. 24, 2025, issued in corresponding EP Patent Application No. 22867083.2.
International Search Report issued in International Application No. PCT/JP2022/027607 on Oct. 4, 2022.

(Continued)

*Primary Examiner* — Manish S Shah
(74) *Attorney, Agent, or Firm* — SOLARIS Intellectual Property Group, PLLC

(57)     ABSTRACT

Provided are an active energy ray-curable inkjet ink containing metal particles, a polymerizable compound, and a polymerization inhibitor, in which the metal particles have a specific gravity of 3 or more, in a cross section of an ink film having a thickness of 1 μm or more, which is obtained by curing a solution prepared by adjusting a content of the metal particles in the active energy ray-curable inkjet ink to 0.5% by mass, 50% by mass or more of a total mass of the metal particles is present in a region within 100 nm from a surface of the ink film to an inside of the ink film, and a surface tension of the active energy ray-curable inkjet ink is 30 mN/m or more; and an image recording method.

11 Claims, No Drawings

(56) References Cited

U.S. PATENT DOCUMENTS

| | | | |
|---|---|---|---|
| 2015/0115202 A1* | 4/2015 | Kagata | C09D 11/40 252/301.36 |
| 2015/0315397 A1* | 11/2015 | Toyoda | B41J 2/04573 347/100 |
| 2016/0264794 A1* | 9/2016 | Takiguchi | C09D 11/107 |
| 2016/0340532 A1* | 11/2016 | Toyoda | C09D 11/107 |
| 2017/0001242 A1* | 1/2017 | Nakao | C09D 7/40 347/100 |
| 2020/0270461 A1 | 8/2020 | Kainou et al. | |
| 2020/0385588 A1* | 12/2020 | Hamanaka | C09D 4/00 |

FOREIGN PATENT DOCUMENTS

| | | | |
|---|---|---|---|
| JP | 2021-63285 A | 4/2021 | |
| JP | 2021-66812 A | 4/2021 | |
| JP | 2021-84289 A | 6/2021 | |
| JP | 2021-100994 A | 7/2021 | |
| WO | WO-2019111822 A1 * | 6/2019 | C09D 11/101 |

Written Opinion of the ISA issued in International Application No. PCT/JP2022/027607 on Oct. 4, 2022.

* cited by examiner

ACTIVE ENERGY RAY-CURABLE INKJET INK AND IMAGE RECORDING METHOD

CROSS-REFERENCE TO RELATED APPLICATIONS

This application is a Continuation of International Application No. PCT/JP2022/027607, filed Jul. 13, 2022, which claims priority to Japanese Patent Application No. 2021-146365, filed Sep. 8, 2021. Each of the above applications is hereby expressly incorporated by reference, in its entirety, into the present application.

BACKGROUND OF THE INVENTION

1. Field of the Invention

The present disclosure relates to an active energy ray-curable inkjet ink and an image recording method.

2. Description of the Related Art

In recent years, studies have been conducted on a method of recording an image having metallic lustrousness by using an active energy ray curable-type ink containing a polymerizable compound.

For example, JP2016-11426A discloses a photocurable ink used for jetting liquid droplets of an inkjet method, which contains surface-treated metal particles that a surface of metal particles is coated by a coating film of a phosphoric acid ester-based compound, and a polymerizable compound, in which a content of liberated phosphoric acid ester-based compound is less than 0.01% by mass, and the phosphoric acid ester compound is fatty acid triglycerin acid ester. JP2021-66812A discloses an inkjet ink containing a metal pigment containing metal indium and/or metal chromium. JP2021-100994A discloses an active energy ray curable-type ink containing scale-like indium particles.

SUMMARY OF THE INVENTION

However, in a case where the image having metallic lustrousness is recorded using the active energy ray-curable ink containing a polymerizable compound, further improvement of the metallic lustrousness of the image may be required.

The present disclosure has been made in consideration of the above circumstances, and according to an embodiment of the present invention, there are provided an active energy ray-curable inkjet ink and an image recording method, with which an image having excellent metallic lustrousness can be recorded.

The present disclosure includes the following aspects.

<1>

An active energy ray-curable inkjet ink comprising:
metal particles;
a polymerizable compound; and
a polymerization inhibitor,
in which the metal particles have a specific gravity of 3 or more,
in a cross section of an ink film having a thickness of 1 μm or more, which is obtained by curing a solution prepared by adjusting a content of the metal particles in the active energy ray-curable inkjet ink to 0.5% by mass, 50% by mass or more of a total mass of the metal particles is present in a region within 100 nm from a surface of the ink film to an inside of the ink film, and a surface tension of the active energy ray-curable inkjet ink is 30 mN/m or more.

<2>

The active energy ray-curable inkjet ink according to <1>, in which at least a part of a surface of the metal particles is coated with at least one polymer selected from the group consisting of cellulose acetate butyrate, cellulose acetate propionate, and cellulose acetate.

<3>

The active energy ray-curable inkjet ink according to <1> or <2>, in which, in the cross section, 70% by mass or more of the total mass of the metal particles is present in the region within 100 nm from the surface of the ink film to the inside of the ink film.

<4>

The active energy ray-curable inkjet ink according to any one of <1> to <3>, in which the metal particles contain indium.

<5>

The active energy ray-curable inkjet ink according to any one of <1> to <4>, in which an average particle diameter of the metal particles is 0.05 μm to 0.5 μm.

<6>

The active energy ray-curable inkjet ink according to any one of <1> to <5>, in which the metal particles have a contour in which a straight line and a curve are bonded to each other in a plan view.

<7>

The active energy ray-curable inkjet ink according to any one of <1> to <6>, in which the surface tension is 40 mN/m or less.

<8>

The active energy ray-curable inkjet ink according to any one of <1> to <7>, in which the surface tension is 32 mN/m to 38 mN/m.

<9>

The active energy ray-curable inkjet ink according to any one of <1> to <8>, in which the active energy ray-curable inkjet ink contains no surfactant, or a content of the surfactant is less than 0.01% by mass.

<10>

An image recording method using the active energy ray-curable inkjet ink according to any one of <1> to <9>, the image recording method comprising:
a step of applying the active energy ray-curable inkjet ink onto a substrate by an inkjet recording method; and
a step of recording an image by curing the active energy ray-curable inkjet ink applied onto the substrate by irradiation with an active energy ray A.

<11>

The image recording method according to <10>, in which the step of recording the image includes
a step of temporarily curing the active energy ray-curable inkjet ink applied onto the substrate by irradiation with an active energy ray P having irradiation energy lower than irradiation energy of the active energy ray A, and
a step of curing an ink film formed by the temporary curing of the active energy ray-curable inkjet ink by irradiation with the active energy ray A to record the image.

According to the embodiment of the present invention, there are provided an active energy ray-curable inkjet ink and an image recording method, with which an image having excellent metallic lustrousness can be recorded.

DESCRIPTION OF THE PREFERRED EMBODIMENTS

Hereinafter, an active energy ray-curable inkjet ink and an image recording method according to embodiments of the present disclosure will be described in detail.

In the present specification, the numerical ranges shown using "to" means ranges including the numerical values described before and after "to" as the minimum value and the maximum value.

In a numerical range described in a stepwise manner in the present specification, an upper limit value or a lower limit value described in a certain numerical range may be replaced with an upper limit value or a lower limit value in another numerical range described in a stepwise manner.

In addition, regarding the numerical range described in the present specification, an upper limit value or a lower limit value described in a numerical value may be replaced with a value described in Examples.

In the present specification, in a case where a plurality of substances corresponding to each component in a composition is present, the amount of each component in the composition means the total amount of the plurality of substances present in the composition, unless otherwise specified.

In the present specification, a combination of two or more preferred aspects is a more preferred aspect.

In the present specification, the meaning of the term "step" includes not only an independent step but also a step whose intended purpose is achieved even in a case where the step is not clearly distinguished from other steps.

In the present specification, "image" means general films, and "image recording" means formation of the image (that is, the film). In addition, the concept of "image" in the present specification also includes a solid image.

In the present specification, "(meth)acrylate" is a concept including both acrylate and methacrylate, "(meth)acryloyl group" is a concept including both acryloyl group and methacryloyl group, and "(meth)acrylic acid" has a concept including both acrylic acid and methacrylic acid.

[Active Energy Ray-Curable Inkjet Ink]

The active energy ray-curable inkjet ink (hereinafter, also simply referred to as "ink") according to the embodiment of the present disclosure contains metal particles, a polymerizable compound, and a polymerization inhibitor, in which the metal particles have a specific gravity of 3 or more, in a cross section of an ink film having a thickness of 1 μm or more, which is obtained by curing a solution prepared by adjusting a content of the metal particles in the ink to 0.5% by mass, 50% by mass or more of a total mass of the metal particles is present in a region within 100 nm from a surface of the ink film to an inside of the ink film, and a surface tension of the ink is 30 mN/m or more.

The ink according to the embodiment of the present disclosure contains metal particles, in which, in a cross section of an ink film having a thickness of 1 μm or more, which is obtained by curing a solution prepared by adjusting a content of the metal particles in the ink to 0.5% by mass, particles with 50% by mass or more of the total mass of the metal particles are present in a region within 100 nm from a surface of the ink film to an inside of the ink film (in a case of an image obtained by applying the ink onto a substrate, a region up to 100 nm inward from a surface of the ink film in a cross section orthogonal to the substrate). That is, in an ink film obtained by curing the ink according to the embodiment of the present disclosure, the metal particles are unevenly distributed on the surface of the ink film. By the presence of a large amount of the metal particles on the surface of the ink film, an image having excellent metallic lustrousness is obtained.

In addition, in the ink according to the embodiment of the present disclosure, the surface tension is 30 mN/m or more, and the metal particles are likely to migrate to a gas-liquid interface. In a case where the ink is cured in a state in which the metal particles are collected at the gas-liquid interface, the metal particles are unevenly distributed on the surface of the ink film. By the presence of a large amount of the metal particles on the surface of the ink film, an image having excellent metallic lustrousness is obtained.

Furthermore, since the ink according to the embodiment of the present disclosure contains a polymerization inhibitor, progress of a polymerization reaction in the ink is suppressed, the metal particles are likely to be collected at the gas-liquid interface in the ink, and the lustrousness of the image is improved.

Meanwhile, JP2016-11426A does not focus on the position of the metal particles present in the ink film.

Hereinafter, each component contained in the ink according to the embodiment of the present disclosure will be described.

The ink according to the embodiment of the present disclosure is an active energy ray-curable ink. That is, the ink according to the embodiment of the present disclosure is cured by irradiation with active energy ray. Examples of the active energy ray include γ-rays, ß-rays, electron beams, ultraviolet rays, and visible rays. Among these, ultraviolet rays are preferable as the active energy ray. It is preferable that the ink according to the embodiment of the present disclosure is an ultraviolet-curable ink.

The ink according to the embodiment of the present disclosure is an inkjet ink. That is, the ink according to the embodiment of the present disclosure is an ink which is used for being jetted by an inkjet recording method.

<Metal Particles>

The ink according to the embodiment of the present disclosure contains at least one metal particle.

A shape of the metal particles is not particularly limited, and examples thereof include a circular shape, an elliptical shape, a rectangular shape, a scaly shape, and an indefinite shape. Among these, the shape of the metal particles is preferably scale-like. In the present disclosure, the term "scale-like" means a thin and flat shape, and is a concept including a flat plate shape and a curved plate shape.

Examples of a metal constituting the metal particles include indium, nickel, aluminum, iron, chromium, silver, gold, platinum, tin, zinc, titanium, and copper.

The metal contained in the metal particles may be one metal or two or more metals.

Among these, from the viewpoint of further improving the metallic lustrousness, the metal particles preferably contain indium or nickel, and more preferably contain indium.

The metal particles may contain a non-metallic element (for example, oxygen (O), nitrogen (N), carbon (C), and the like).

A content of the metal with respect to the total amount of the metal particles is preferably 50% by mass or more, more preferably 60% by mass or more, and still more preferably 80% by mass or more. The above-described content may be 100% by mass.

(Average Particle Diameter)

An average particle diameter of the metal particles is not particularly limited, but is preferably 0.05 μm to 0.5 μm and more preferably 0.1 μm to 0.4 μm.

In a case where the average particle diameter is 0.05 μm or more, the metallic lustrousness of the image is improved. In a case where the average particle diameter is 0.5 μm or less, storage stability and jettability of the ink are improved.

The average particle diameter herein means an average value (average primary particle diameter) of primary particle diameters of the metal particles.

The average particle diameter of the metal particles is measured using a particle size distribution analyzer. By using a laser diffraction/scattering-type particle size distribution analyzer, a 50% cumulative volume-based diameter (D50) of the metal particles is measured three times, and an average value of the diameters measured three times is calculated and adopted as the average particle diameter of the metal particles. As the laser diffraction/scattering-type particle size distribution analyzer, for example, a product name "LA-960" manufactured by Horiba, Ltd. can be used. The average particle diameter of the metal particles is an average particle diameter in a case where the shape of the metal particles is assumed to be spherical.

An average aspect ratio of the metal particles is not particularly limited, but is preferably 5 to 100, more preferably 5 to 50, and still more preferably 5 to 20.

In a case where the average aspect ratio is 5 or more, the metallic lustrousness of the image is improved. In a case where the average aspect ratio is 100 or less, manufacturing suitability of the metal particles is improved.

In the present disclosure, the average aspect ratio means a ratio of an average equivalent circle diameter to an average thickness.

The average equivalent circle diameter and the average thickness of the metal particles are measured using the following method.

As a liquid sample, a metal particle dispersion which contains metal particles as a dispersoid and propylene glycol monomethyl ether (PGME) as a dispersion medium is prepared (concentration of the metal particles: 20% by mass).

The liquid sample is applied onto a polyethylene terephthalate (PET) film to obtain a coating film.

A surface of the above-described coating film is observed with a scanning electron microscope (SEM) (for example, Nova 200 FIB-SEM manufactured by Thermo Fisher Scientific Inc.; the same applies hereinafter), and from the obtained SEM image, 50 metal particles are selected and an equivalent circle diameter of each metal particle is measured. An arithmetic mean value of the equivalent circle diameters of the 50 metal particles is calculated and adopted as the average equivalent circle diameter of the metal particles.

A cross section of the above-described coating film is observed with SEM, and from the obtained SEM image, 50 metal particles are selected and a thickness of each metal particle is measured. An arithmetic mean value of the thicknesses of the 50 metal particles is calculated and adopted as the average thickness of the metal particles.

The average thickness of the metal particles is not particularly limited, but from the viewpoint of improving the metallic lustrousness of the image, it is preferably 10 nm to 50 nm, more preferably 15 nm to 45 nm, and still more preferably 20 nm to 40 nm.

(Planar Shape)

Examples of a planar shape of the metal particles include a polygonal shape, an elliptical shape, and an indefinite shape. From the viewpoint of improving the metallic lustrousness of the image, it is preferable that the metal particles have a contour in which a straight line and a curve are bonded to each other in a plan view. In addition, it is preferable that the metal particles have an R-shaped contour in the plan view.

In the present disclosure, the R shape means a shape in which a vertex where two sides are in contact with each other does not exist. In short, it is preferable that the metal particles have a rounded contour in the plan view. The contour of the metal particles in the plan view may have a concave portion.

It is preferable that at least a part of the surface of the metal particles is coated with a polymer, and it is more preferable to be coated with at least one polymer selected from the group consisting of cellulose acetate butyrate, cellulose acetate propionate, and cellulose acetate.

In a case where the surface of the metal particles is coated with the above-described polymer, surface energy of the above-described polymer pushes the metal particles up to the gas-liquid interface of the ink together with the above-described polymer. The metal particles are collected at the gas-liquid interface of the ink and are unevenly distributed on the surface of the ink film after the ink is cured, so that an image having excellent metallic lustrousness is obtained.

The metal particles coated with the above-described polymer are preferably flakes peeled from a metal film. The flakes of the metal film are obtained, for example, by the following method.

At least one polymer selected from the group consisting of cellulose acetate butyrate, cellulose acetate propionate, and cellulose acetate is applied onto a substrate to form a polymer layer. A metal film containing a metal is formed on the polymer layer. The polymer layer is dissolved to peel off the metal film. By cracking or crushing the metal film, the metal particles are obtained.

The metal film may be peeled off in a state in which the polymer layer is adsorbed on one surface. By cracking or crushing the metal film in the state in which the polymer layer is adsorbed on one surface of the metal film, the metal particles coated with the above-described polymer are obtained.

Examples of a method of forming the metal film include vapor deposition and sputtering. For example, a metal film containing indium forms, during the vapor deposition, a sea-island structure scattered in an island shape without being a continuous film. Therefore, the metal particles are obtained only by cracking without applying a large force. The flakes of the metal film containing indium (that is, the metal particles containing indium) have an R-shaped contour in the plan view. On the other hand, a metal film containing aluminum, nickel, or silver forms a continuous film during the vapor deposition. Therefore, in order to obtain the metal particles, a crushing treatment is required. The flakes after the crushing treatment tend to have a sharp edge.

(Specific Gravity)

From the viewpoint of improving the metallic lustrousness of the image, the metal particles have a specific gravity of 3 or more. The upper limit value of the specific gravity is not particularly limited, but for example, from the viewpoint of improving the metallic lustrousness of the image, it is 12.

In the present disclosure, the "specific gravity of the metal particles" refers to a specific gravity of the metal constituting the metal particles, and in a case where the metal particles are an alloy, it refers to a specific gravity of the alloy.

The specific gravity of the metal particles is measured by the method described in JIS Z8807:2012. In addition, it is also possible to identify the type of the metal by element analysis and adopt a literature value of the metal.

(Presence Proportion of Metal Particles on Surface of Image)

In the present disclosure, the metal particles are metal particles having the following properties.

In a cross section of an ink film having a thickness of 1 μm or more, which is obtained by curing a solution prepared by adjusting a content of the metal particles in the ink to 0.5% by mass, 50% by mass or more of a total mass of the metal particles is present in a region within 100 nm from a surface of the ink film to an inside of the ink film. In a case where the ink contains metal particles having a property that the presence proportion on the surface of the ink film is 50% by mass or more, an image having excellent metallic lustrousness is obtained.

In the present disclosure, the cross section of the ink film means a cross section of the ink film in a thickness direction (that is, a cut cross section obtained by cutting the image along a plane perpendicular to the surface of the substrate).

The presence proportion of the metal particles on the surface of the ink film can be confirmed by the following method.

First, the ink is prepared as a solution by adjusting a content of the metal particles in the ink to 0.5% by mass. In a case where the content of the metal particles in the ink is more than 0.5% by mass, the ink is diluted using a diluent. As the diluent, a polymerizable compound having the highest content in the ink is selected. In a case where two or more kinds of polymerizable compounds having the highest content are present, these compounds are used evenly.

The solution prepared by adjusting the content of the metal particles in the ink to 0.5% by mass is dropped onto a substrate, a liquid film is formed using K HAND COATER No. 2 (wet film thickness: 12 μm; manufactured by RK PRINTCOAT INSTRUMENTS), and the liquid film is cured by irradiation with active energy ray to obtain an ink film.

The obtained ink film is cut in a direction orthogonal to the surface of the substrate. The cross section of the ink film is observed with a scanning electron microscope (SEM) (for example, Nova 200 FIB-SEM manufactured by Thermo Fisher Scientific Inc.) at a magnification of 50,000 times. The number X of metal particles present in the entire cross section of the ink film and the number Y of metal particles present in a region within 100 nm from the surface of the ink film are measured. A proportion of the number Y to the number X is calculated, and it is determined whether or not the calculated value is 50% or more.

In the confirming method, masses of the metal particles are considered to be the same, and the presence proportion based on the number of the metal particles is equivalent to the presence proportion based on the mass of the metal particles.

From the viewpoint of improving the metallic lustrousness of the image, in the cross section of the ink film obtained by curing the solution prepared by adjusting the content of the metal particles in the ink to 0.5% by mass, it is preferable that 70% by mass or more of the metal particles is present in a region within 100 nm from the surface of the ink film, and it is preferable that 80% by mass or more of the metal particles is present in the region. The upper limit value of the presence proportion is not particularly limited, and may be 100% by mass.

A content of the metal particles is preferably 0.5% by mass to 10% by mass and more preferably 1.0% by mass to 8.0% by mass with respect to the total amount of the ink.

<Polymerizable Compound>

The ink according to the embodiment of the present disclosure contains at least one polymerizable compound.

The polymerizable compound is a compound having a polymerizable group. As the polymerizable group, a radically polymerizable group or a cationically polymerizable group is preferable, and a radically polymerizable group is more preferable.

The polymerizable compound may have only one polymerizable group or two or more polymerizable groups.

As the polymerizable compound, a radically polymerizable compound is preferable.

The radically polymerizable group is preferably an ethylenically unsaturated group, more preferably at least one selected from the group consisting of a (meth)acryloyl group, an allyl group, a styryl group, and a vinyl group, and still more preferably a (meth)acryloyl group.

Examples of the cationically polymerizable group include an epoxy group and an oxetanyl group.

The polymerizable compound may be a polymerizable monomer, a polymerizable polymer, or a combination of a polymerizable monomer and a polymerizable polymer.

Here, the polymerizable monomer means a polymerizable compound having a molecular weight of less than 1,000, and the polymerizable polymer means a polymerizable compound having a weight-average molecular weight (Mw) of 1,000 or more. The concept of "polymerizable polymer" in the present disclosure also includes so-called oligomers.

The weight-average molecular weight (Mw) of the polymerizable compound is preferably 30,000 or less, more preferably 20,000 or less, and still more preferably 10,000 or less.

Examples of the lower limit of Mw of the polymerizable compound include 50, 60, and 70.

In the present disclosure, the weight-average molecular weight (Mw) means a value measured by gel permeation chromatography (GPC).

In the measurement by GPC, HLC (registered trademark)-8020GPC (Tosoh Corporation) is used as a measuring device, three columns of TSKgel (registered trademark) Super Multipore HZ-H (4.6 mmID×15 cm, Tosoh Corporation) are used as a column, and tetrahydrofuran (THF) is used as an eluent. In addition, as the measurement conditions, a sample concentration of 0.45% by mass, a flow rate of 0.35 ml/min, a sample injection amount of 10 μL, and a measurement temperature of 40° C. are set, and a RI detector is used.

The calibration curve is created from eight samples of "Standard sample TSK standard, polystyrene" manufactured by Tosoh Corporation: "F-40", "F-20", "F-4", "F-1", "A-5000", "A-2500", "A-1000", and "n-propylbenzene".

The polymerizable compound may be a monofunctional polymerizable compound or a polyfunctional polymerizable compound (that is, a bi- or higher functional polymerizable compound).

Here, the monofunctional polymerizable compound means a compound including only one polymerizable group in one molecule, and the polyfunctional polymerizable compound means a compound including two or more polymerizable groups in one molecule.

(Monofunctional Polymerizable Compound)

Examples of the monofunctional polymerizable compound include monofunctional (meth)acrylate, monofunctional (meth)acrylamide, a monofunctional aromatic vinyl compound, monofunctional vinyl ether, and a monofunctional N-vinyl compound.

Examples of the monofunctional (meth)acrylate include methyl (meth)acrylate, ethyl (meth)acrylate, propyl (meth) acrylate, n-butyl (meth)acrylate, hexyl (meth)acrylate, 2-ethylhexyl (meth)acrylate, tert-octyl (meth)acrylate, isoamyl (meth)acrylate, decyl (meth)acrylate, isodecyl (meth) acrylate, lauryl (meth)acrylate, stearyl (meth)acrylate, isostearyl (meth)acrylate, cyclohexyl (meth)acrylate, 4-n-butylcyclohexyl (meth)acrylate, 4-tert-butylcyclohexyl (meth)acrylate, bornyl (meth)acrylate, isobornyl (meth) acrylate, 2-ethylhexyldiglycol (meth)acrylate, butoxyethyl (meth)acrylate, 2-chloroethyl (meth)acrylate, 4-bromobutyl (meth)acrylate, cyanoethyl (meth)acrylate, benzyl (meth) acrylate, butoxymethyl (meth)acrylate, 3-methoxybutyl (meth)acrylate, 2-(2-methoxyethoxy)ethyl (meth)acrylate, 2-(2-butoxyethoxy)ethyl (meth)acrylate, ethyl carbitol (meth)acrylate, 2,2,2-tetrafluoroethyl (meth)acrylate, 1H,1H,2H,2H-perfluorodecyl (meth)acrylate, 4-butylphenyl (meth)acrylate, phenyl (meth)acrylate, 2,4,5-tetramethylphenyl (meth)acrylate, 4-chlorophenyl (meth)acrylate, 2-phenoxymethyl (meth)acrylate, 2-phenoxyethyl (meth) acrylate, glycidyl (meth)acrylate, glycidyloxybutyl (meth) acrylate, glycidyloxyethyl (meth)acrylate, glycidyloxypropyl (meth)acrylate, tetrahydrofurfuryl (meth)acrylate, 2-hydroxyethyl (meth)acrylate, 3-hydroxypropyl (meth) acrylate, 2-hydroxypropyl (meth)acrylate, 2-hydroxybutyl (meth)acrylate, 3-hydroxybutyl (meth)acrylate, 4-hydroxybutyl (meth)acrylate, cyclic trimethylolpropane formal (meth)acrylate, phenylglycidyl ether (meth)acrylate, dimethylaminoethyl (meth)acrylate, diethylaminoethyl (meth) acrylate, dimethylaminopropyl (meth)acrylate, diethylaminopropyl (meth)acrylate, trimethoxysilylpropyl (meth)acrylate, trimethylsilylpropyl (meth)acrylate, polyethylene oxide monomethyl ether (meth)acrylate, polyethylene oxide (meth)acrylate, polyethylene oxide monoalkyl ether (meth)acrylate, dipropylene glycol (meth)acrylate, polypropylene oxide monoalkyl ether (meth)acrylate, 2-methacryloyloxyethyl succinate, 2-methacryloyloxyhexahydrophthalic acid, 2-methacryloyloxyethyl-2-hydroxypropyl phthalate, butoxydiethylene glycol (meth)acrylate, 2,2, 2-trifluoroethyl (meth)acrylate, perfluorooctylethyl (meth) acrylate, 2-hydroxy-3-phenoxypropyl (meth)acrylate, ethylene oxide (EO)-modified phenol (meth)acrylate, EO-modified cresol (meth)acrylate, EO-modified nonylphenol (meth)acrylate, propylene oxide (PO)-modified nonylphenol (meth)acrylate, EO-modified-2-ethylhexyl (meth)acrylate, dicyclopentenyl (meth)acrylate, dicyclopentenyloxyethyl (meth)acrylate, dicyclopentanyl (meth)acrylate, (3-ethyl-3-oxctanylmethyl) (meth)acrylate, and phenoxyethylene glycol (meth)acrylate.

Examples of the monofunctional (meth)acrylamide include (meth)acrylamide, N-methyl (meth)acrylamide, N-ethyl (meth)acrylamide, N-propyl (meth)acrylamide, N-n-butyl (meth)acrylamide, N-t-butyl (meth)acrylamide, N-butoxymethyl (meth)acrylamide, N-isopropyl (meth) acrylamide, N-methylol (meth)acrylamide, N,N-dimethyl (meth)acrylamide, N,N-diethyl (meth)acrylamide, and (meth)acryloylmorpholine.

Examples of the monofunctional aromatic vinyl compound include styrene, dimethylstyrene, trimethylstyrene, isopropylstyrene, chloromethylstyrene, methoxystyrene, acetoxystyrene, chlorostyrene, dichlorostyrene, bromostyrene, vinyl benzoic acid methyl ester, 3-methylstyrene, 4-methylstyrene, 3-ethylstyrene, 4-ethylstyrene, 3-propylstyrene, 4-propylstyrene, 3-butylstyrene, 4-butylstyrene, 3-hexylstyrene, 4-hexylstyrene, 3-octylstyrene, 4-octylstyrene, 3-(2-ethylhexyl)styrene, 4-(2-ethylhexyl)styrene, allyl styrene, isopropenyl styrene, butenyl styrene, octenyl styrene, 4-t-butoxycarbonyl styrene, and 4-t-butoxystyrene.

Examples of the monofunctional vinyl ether include methyl vinyl ether, ethyl vinyl ether, propyl vinyl ether, n-butyl vinyl ether, t-butyl vinyl ether, 2-ethylhexyl vinyl ether, n-nonyl vinyl ether, lauryl vinyl ether, cyclohexyl vinyl ether, cyclohexyl methyl vinyl ether, 4-methylcyclohexyl methyl vinyl ether, benzyl vinyl ether, dicyclopentenyl vinyl ether, 2-dicyclopentenoxyethyl vinyl ether, methoxyethyl vinyl ether, ethoxyethyl vinyl ether, butoxyethyl vinyl ether, methoxyethoxyethyl vinyl ether, ethoxyethoxyethyl vinyl ether, methoxypolyethylene glycol vinyl ether, tetrahydrofurfuryl vinyl ether, 2-hydroxyethyl vinyl ether, 2-hydroxypropyl vinyl ether, 4-hydroxybutyl vinyl ether, 4-hydroxymethylcyclohexylmethyl vinyl ether, diethylene glycol monovinyl ether, polyethylene glycol vinyl ether, chloroethyl vinyl ether, chlorobutyl vinyl ether, chloroethoxyethyl vinyl ether, phenylethyl vinyl ether, and phenoxypolyethylene glycol vinyl ether.

Examples of the monofunctional N-vinyl compound include N-vinylcaprolactam and N-vinylpyrrolidone.

(Polyfunctional Polymerizable Compound)

The polyfunctional polymerizable compound is a bi- or higher functional polymerizable compound.

—Bifunctional Polymerizable Compound—

Examples of the bifunctional polymerizable compound include bifunctional (meth)acrylate, bifunctional vinyl ether, and a bifunctional polymerizable compound including a vinyl ether group and a (meth)acryloyl group.

Examples of the bifunctional (meth)acrylate include ethylene glycol di(meth)acrylate, diethylene glycol di(meth) acrylate, triethylene glycol di(meth)acrylate, propylene glycol di(meth)acrylate, dipropylene glycol di(meth)acrylate, tripropylene glycol di(meth)acrylate, polyethylene glycol di(meth)acrylate, polypropylene glycol di(meth)acrylate, butylene glycol di(meth)acrylate, tetraethylene glycol di(meth)acrylate, neopentyl glycol di(meth)acrylate, 3-methyl-1,5-pentanediol di(meth)acrylate, hexanediol di(meth)acrylate, heptanediol di(meth)acrylate, EO-modified neopentyl glycol di(meth)acrylate, PO-modified neopentyl glycol di(meth)acrylate, EO-modified hexanediol di(meth)acrylate, PO-modified hexanediol di(meth)acrylate, octanediol di(meth)acrylate, nonanediol di(meth)acrylate, decanediol di(meth)acrylate, dodecanediol di(meth)acrylate, 1,6-hexanediol di(meth)acrylate, glycerin di(meth)acrylate, pentaerythritol di(meth)acrylate, ethylene glycol diglycidyl ether di(meth)acrylate, diethylene glycol diglycidyl ether di(meth)acrylate, and tricyclodecanedimethanol di(meth) acrylate.

Examples of the bifunctional vinyl ether include 1,4-butanediol divinyl ether, ethylene glycol divinyl ether, diethylene glycol divinyl ether, triethylene glycol divinyl ether, polyethylene glycol divinyl ether, propylene glycol divinyl ether, butylene glycol divinyl ether, hexanediol divinyl ether, 1,4-cyclohexanedimethanol divinyl ether, bisphenol A alkylene oxide divinyl ether, and bisphenol F alkylene oxide divinyl ether.

Examples of the bifunctional polymerizable compound including a vinyl ether group and a (meth)acryloyl group include 2-(2-vinyloxyethoxy)ethyl (meth)acrylate.

—Tri- or Higher Functional Polymerizable Compound—

Examples of the tri- or higher functional polymerizable compound include tri- or higher functional (meth)acrylate and tri- or higher functional vinyl ether.

Examples of the tri- or higher functional (meth)acrylate include trimethylolethane tri(meth)acrylate, trimethylolpropane tri(meth)acrylate, EO-modified trimethylolpropane tri (meth)acrylate, PO-modified trimethylolpropane tri(meth) acrylate, pentaerythritol tri(meth)acrylate, pentacrythritol tetra(meth)acrylate, dipentaerythritol tetra(meth)acrylate, dipentaerythritol penta(meth)acrylate, dipentaerythritol hexa(meth)acrylate, tri(meth)acryloyloxyethoxytrimethylolpropane, glycerin polyglycidyl ether poly(meth)acrylate, and tris(2-acryloyloxyethyl) isocyanurate.

Examples of the tri- or higher functional vinyl ether include trimethylolethane trivinyl ether, trimethylolpropane trivinyl ether, ditrimethylolpropane tetravinyl ether, glycerin trivinyl ether, pentacrythritol tetravinyl ether, dipentaerythritol pentavinyl ether, dipentaerythritol hexavinyl ether, EO-modified trimethylolpropane trivinyl ether, PO-modified trimethylolpropane trivinyl ether, EO-modified ditrimethylolpropane tetravinyl ether, PO-modified ditrimethylolpropane tetravinyl ether, EO-modified pentaerythritol tetravinyl ether, PO-modified pentaerythritol tetravinyl ether, EO-modified dipentaerythritol hexavinyl ether, and PO-modified dipentaerythritol hexavinyl ether.

Examples of the polyfunctional polymerizable compound also include urethane (meth)acrylate.

The urethane (meth)acrylate is preferably a compound including two or three (meth)acryloyl groups and at least one urethane bond.

Examples of the urethane (meth)acrylate include urethane (meth)acrylate which is a reaction product of a bifunctional isocyanate compound and a hydroxyl group-containing (meth)acrylate (with another active hydrogen group-containing compound as necessary).

Examples of the bifunctional isocyanate compound include aliphatic diisocyanates such as methylene diisocyanate, dimethylene diisocyanate, trimethylene diisocyanate, tetramethylene diisocyanate, pentamethylene diisocyanate, hexamethylene diisocyanate, dipropyl ether diisocyanate, 2,2-dimethylpentane diisocyanate, 3-methoxyhexane diisocyanate, octamethylene diisocyanate, 2,2,4-trimethylpentane diisocyanate, nonamethylene diisocyanate, decamethylene diisocyanate, 3-butoxyhexane diisocyanate, 1,4-butylene glycol dipropyl ether diisocyanate, and thiodihexyl diisocyanate; aromatic diisocyanates such as m-phenylene diisocyanate, p-phenylene diisocyanate, 2,4-tolylene diisocyanate, 2,6-tolylene diisocyanate, dimethylbenzene diisocyanate, ethylbenzene diisocyanate, isopropylbenzene diisocyanate, tolidine diisocyanate, 1,4-naphthalene diisocyanate, 1,5-naphthalene diisocyanate, 2,6-naphthalene diisocyanate, 2,7-naphthalene diisocyanate, metaxylylene diisocyanate, paraxylylene diisocyanate, and tetramethylxylylene diisocyanate; and alicyclic diisocyanates such as hydrogenated xylylene diisocyanate, isophorone diisocyanate, and dicyclohexylmethane 4,4'-diisocyanate.

Examples of the hydroxyl group-containing (meth)acrylate include 2-hydroxyethyl (meth)acrylate, 3-hydroxypropyl (meth)acrylate, 2-hydroxypropyl (meth)acrylate, 2-hydroxybutyl (meth)acrylate, 3-hydroxybutyl (meth)acrylate, 4-hydroxybutyl (meth)acrylate, phenylglycidyl ether (meth) acrylate, pentaerythritol (meth)acrylate, and dipentacrythritol penta(meth)acrylate.

Examples of a commercially available product of the urethane (meth)acrylate include CN996 (bifunctional urethane acrylate, weight-average molecular weight (Mw)=2, 850) of Sartomer Company Inc.; UA-122P (bifunctional urethane acrylate, Mw=1,100) of SHIN-NAKAMURA CHEMICAL CO, LTD.; and Shikoh (registered trademark) UV-6630B (bifunctional urethane acrylate, Mw=3,000) of NIHON GOSEI KAKO Co., Ltd., Shikoh (registered trademark) UV-3310B (bifunctional urethane acrylate, Mw=5, 000), and Shikoh (registered trademark) UV-7630B (hexafunctional urethane acrylate, Mw=2,200) of NIHON GOSEI KAKO Co., Ltd.

Examples of the polyfunctional polymerizable compound also include a silicone compound having an ethylenically unsaturated group.

The silicone compound having an ethylenically unsaturated group is preferably silicone polyether acrylate, more preferably polyfunctional silicone polyether acrylate, and still more preferably pentafunctional or hexafunctional silicone polyether acrylate.

Examples of the bifunctional polymerizable compound and the tri- or higher functional polymerizable compound described above also include epoxy (meth)acrylate.

Here, the epoxy (meth)acrylate means a reaction product of a reaction between a carboxy group in (meth)acrylic acid and two or three epoxy groups in an epoxy compound including two or three epoxy groups. That is, the structure of the epoxy (meth)acrylate does not include an epoxy group.

Examples of the epoxy (meth)acrylate include a reaction product of (meth)acrylic acid and an epoxy resin.

Examples of the epoxy resin include a bisphenol A-type epoxy resin and a cresol novolac-type epoxy resin.

A content of the polymerizable compound is preferably 50% by mass to 95% by mass and more preferably 60% by mass to 90% by mass with respect to the total amount of the ink.

<Organic Solvent>

The ink according to the embodiment of the present disclosure may contain at least one organic solvent.

As the organic solvent, it is possible to use known organic solvents which can be used for ink. Examples of the known organic solvents include organic solvents described in a new edition of "Solvent pocket book" (edited by The Society of Synthetic Organic Chemistry, Japan., published in 1994), and the like.

Examples of the organic solvent include (poly)alkylene glycol monoalkyl ethers such as ethylene glycol monoethyl ether, diethylene glycol monoethyl ether, triethylene glycol monomethyl ether, propylene glycol monomethyl ether (PGME), dipropylene glycol monomethyl ether, and tripropylene glycol monomethyl ether;

(poly)alkylene glycol dialkyl ethers such as ethylene glycol dibutyl ether, diethylene glycol dimethyl ether, diethylene glycol diethyl ether, dipropylene glycol diethyl ether, and tetraethylene glycol dimethyl ether;

(poly)alkylene glycol acetates such as diethylene glycol acetate;

(poly)alkylene glycol diacetates such as ethylene glycol diacetate and propylene glycol diacetate;

(poly)alkylene glycol monoalkyl ether acetates such as ethylene glycol monobutyl ether acetate and propylene glycol monomethyl ether acetate, ketones such as methyl ethyl ketone and cyclohexanone;

lactones such as γ-butyrolactone;

esters such as ethyl acetate, propyl acetate, butyl acetate, 3-methoxybutyl acetate (MBA), methyl propionate, and ethyl propionate;

cyclic ethers such as tetrahydrofuran and dioxane; and amides such as dimethylformamide and dimethylacetamide.

The above-described (poly)alkylene glycol is preferably (poly)ethylene glycol and/or (poly)propylene glycol.

A content of the organic solvent is preferably 0.1% by mass to 30% by mass and more preferably 0.1% by mass to 20% by mass with respect to the total amount of the ink.

<Photopolymerization Initiator>

The ink according to the embodiment of the present disclosure preferably contains at least one photopolymerization initiator.

The photopolymerization initiator is preferably a radical polymerization initiator which generates radicals by being irradiated with light.

Examples of the radical polymerization initiator include (a) an alkylphenone compound, (b) an acylphosphine oxide compound, (c) an aromatic onium salt compound, (d) an organic peroxide, (e) a thio compound (for example, a thioxanthone compound such as isopropylthioxanthone), (f) a hexaarylbiimidazole compound, (g) a ketoxime ester compound, (h) a borate compound, (i) an azinium compound, (j) a metallocene compound, (k) an active ester compound, (l) a carbon halogen bond-containing compound, and (m) an alkylamine compound.

Among these, it is preferable that the photopolymerization initiator includes an acylphosphine oxide compound.

Examples of the acylphosphine oxide compound include bis(2,4,6-trimethylbenzoyl)phenylphosphine oxide, bis(2,6-dimethylbenzoyl)phenylphosphine oxide, bis(2,4,6-trimethylbenzoyl)-2-methoxyphenylphosphine oxide, bis(2,6-dimethylbenzoyl)-2-methoxyphenylphosphine oxide, bis(2,4,6-trimethylbenzoyl)-2,4-dimethoxyphenylphosphine oxide, bis(2,6)-dimethylbenzoyl)-2,4-dimethoxyphenylphosphine oxide, bis(2,4,6-trimethylbenzoyl)-2,4-dipentyloxyphenylphosphine oxide, bis(2,6-dimethylbenzoyl)-2,4-dipentyloxyphenylphosphine oxide, 2,4,6-trimethylbenzoylethoxyphenylphosphine oxide, 2,6-dimethylbenzoylethoxyphenylphosphine oxide, 2,4,6-trimethylbenzoylmethoxyphenylphosphine oxide, bis(2,6-dimethoxybenzoyl)-2,4,4-trimethylpentylphenylphosphine oxide, 2,4,6-trimethylbenzoyldiphenylphosphine oxide, 2,6-dimethylbenzoylmethoxyphenylphosphine oxide, 2,4,6-trimethylbenzoyl(4-pentyloxyphenyl)phenylphosphine oxide, and 2,6-dimethylbenzoyl(4-pentyloxyphenyl)phenylphosphine oxide.

Among these, as the acylphosphine oxide compound, bis(2,4,6-trimethylbenzoyl)phenylphosphine oxide or 2,4,6-trimethylbenzoyldiphenylphosphine oxide is preferable.

The photopolymerization initiator may be a low-molecular-weight photopolymerization initiator having a molecular weight of less than 500, or a high-molecular-weight photopolymerization initiator having a molecular weight of 500 or more.

A molecular weight of the photopolymerization initiator is preferably 500 to 3,000, more preferably 700 to 2,500, and still more preferably 900 to 2,100.

For the photopolymerization initiator, the publications such as JP2017-105902A (paragraphs 0038 and the like) and JP2017-522364A (paragraphs 0017 to "0053) can be referred to.

Examples of a commercially available product of the radical polymerization initiator include
   commercially available products of low-molecular-weight radical polymerization initiator, such as Omnirad TPO H, Omnirad 819, Omnirad 369, Omnirad 907, and Omnirad 2959 (manufactured by IGM Resins B. V.); and
   commercially available products of high-molecular-weight radical polymerization initiators, such as Omnipole 910, Omnipole TX, and Omnipole 9210 (manufactured by IGM Resins B. V.), Speedcure 7005, Speedcure 7010, Speedcure 7010L, and Speedcure 7040 (manufactured by Lambson Ltd.).

The ink according to the embodiment of the present disclosure may contain two or more photopolymerization initiators having different absorption wavelengths.

For example, in an image recording method described later, in a case where pinning exposure (temporary curing) by an active energy ray P (for example, long-wavelength ultraviolet light) and curing exposure (main curing) by an active energy ray A are performed in this order, the ink may contain a photopolymerization initiator P which easily absorbs the active energy ray P and a photopolymerization initiator A which easily absorbs the active energy ray A. According to this aspect, the metallic lustrousness and sharpness of the image can be further improved.

A content of the photopolymerization initiator is preferably 1% by mass to 20% by mass, more preferably 2% by mass to 15% by mass, still more preferably 3% by mass to 10% by mass, and particularly preferably 3% by mass to 8% by mass with respect to the total amount of the ink.

On the other hand, in a case where the ink according to the embodiment of the present disclosure is an ink which is cured by an electron beam as the active energy ray, the content of the photopolymerization initiator with respect to the total amount of the ink may be less than 1% by mass.

Here, the fact that the content of the photopolymerization initiator with respect to the total amount of the ink is less than 1% by mass means that the ink does not contain a photopolymerization initiator or that, in a case of containing the photopolymerization initiator, the content of the photopolymerization initiator with respect to the total amount of the ink is less than 1% by mass.

<Surfactant>

The ink according to the embodiment of the present disclosure may contain at least one surfactant.

Examples of the surfactant include surfactants described in JP1987-173463A (JP-S62-173463A) and JP1987-183457A (JP-S62-183457A). In addition, examples of the surfactant include anionic surfactants such as dialkyl sulfosuccinate, alkyl naphthalene sulfonate, and a fatty acid salt; nonionic surfactants such as polyoxyethylene alkyl ether, polyoxyethylene alkyl allyl ether, acetylene glycol, and a polyoxyethylene-polyoxypropylene block copolymer; and cationic surfactants such as an alkylamine salt and a quaternary ammonium salt. In addition, the surfactant may be a fluorine-based surfactant or a silicone-based surfactant.

From the viewpoint of setting the surface tension of the ink to 30 mN/m or more, it is preferable that the ink according to the embodiment of the present disclosure does not contain a surfactant, or a content of the surfactant is less than 0.01% by mass.

<Polymerization Inhibitor>

The ink according to the embodiment of the present disclosure contains at least one polymerization inhibitor. The metal particles easily induce the polymerization reaction of the polymerizable compound, but in a case where the ink contains the polymerization inhibitor, the progress of the polymerization reaction in the ink is suppressed. As a result, the metal particles are likely to be collected at the gas-liquid interface in the ink, and the lustrousness of the image is improved. In addition, since the progress of the polymerization reaction in the ink is suppressed, the temporal stability of the ink is also improved. Furthermore, since the progress of the polymerization reaction in the ink is suppressed, formation of coarse particles in the ink is suppressed, the jettability is improved, and thus image quality is also improved.

15

16

Examples of the polymerization inhibitor include p-methoxyphenol, quinones (for example, hydroquinone, benzoquinone, methoxybenzoquinone, and the like), phenothiazine, catechols, alkylphenols (for example, dibutyl hydroxy toluene (BHT) and the like), alkyl bisphenols, zinc dimethyldithiocarbamate, copper dimethyldithiocarbamate, copper dibutyldithiocarbamate, copper salicylate, thiodipropionic acid esters, mercaptobenzimidazole, phosphites, 2,2, 6,6-tetramethylpiperidine-1-oxyl (TEMPO), 2,2,6,6-tetramethyl-4-hydroxypiperidine-1-oxyl (TEMPOL), and tris(N-nitroso-N-phenylhydroxylamine)aluminum salt (also known as Cupferron A1).

Among these, as the polymerization inhibitor, at least one selected from p-methoxyphenol, catechols, quinones, alkylphenols, TEMPO, TEMPOL, and tris(N-nitroso-N-phenylhydroxylamine)aluminum salt is preferable, and at least one selected from p-methoxyphenol, hydroquinone, benzoquinone, BHT, TEMPO, TEMPOL, and tris(N-nitroso-N-phenylhydroxylamine)aluminum salt is more preferable.

In a case where the ink contains the polymerization inhibitor, a content of the polymerization inhibitor is preferably 0.01% by mass to 5.0% by mass, more preferably 0.05% by mass to 4.0% by mass, and particularly preferably 0.1% by mass to 3.0% by mass with respect to the total amount of the ink.

<Other Components>

As necessary, the ink according to the embodiment of the present disclosure may contain other components in addition to the components described above.

Examples of the other components include colorants (for example, pigments and dyes), resins, dispersants, wax, antioxidants, antifading agents, conductive salts, and basic compounds.

<Physical Properties>

The surface tension of the ink according to the embodiment of the present disclosure is 30 mN/m or more. In a case where the surface tension of the ink is 30 mN/m or more, the metal particles are likely to be collected at the gas-liquid interface, and the metal particles are unevenly distributed on the surface of the image, and thus the metallic lustrousness of the image is improved.

From the viewpoint of image quality, the surface tension of the ink is preferably 40 mN/m or less. That is, the surface tension of the ink is preferably 30 mN/m to 40 mN/m and more preferably 32 mN/m to 38 mN/m.

The surface tension means a value measured at 25° C.

The surface tension is a value measured using a surface tensiometer, and can be measured using, for example, product name "Automatic Surface Tensiometer CBVP-Z (manufactured by Kyowa Interface Science Co., Ltd.)".

A viscosity of the ink according to the embodiment of the present disclosure is preferably 5 mPa·s to 50 mPa·s, more preferably 10 mPa·s to 30 mPa·s, and still more preferably 10 mPa·s to 25 mPa·s.

The viscosity means a value measured at 25° C.

The viscosity is a value measured using a viscometer, and can be measured using, for example, VISCOMETER RE-85L (manufactured by TOKI SANGYO CO., LTD.).

The ink according to the embodiment of the present disclosure may be combined with an undercoat liquid to be used as an ink set.

The undercoat liquid is a liquid which is applied onto the substrate before the ink according to the embodiment of the present disclosure is applied, and is for forming an undercoat layer. As a result, it is possible to manufacture an image recorded material including an undercoat layer between an image and a substrate. The image recorded material including the undercoat layer can form a high-definition image. In addition, in such an image recorded material, adhesiveness between the image and the substrate is more excellent.

(Undercoat Liquid)

It is preferable that the undercoat liquid does not contain metal particles and contains a polymerizable compound.

Specific examples of the polymerizable compound contained in the undercoat liquid are the same as the specific examples of the polymerizable compound contained in the ink.

The undercoat liquid may contain other components (for example, a photopolymerization initiator) in addition to the polymerizable compound.

For the other components contained in addition to the polymerizable compound, the components in the ink according to the embodiment of the present disclosure can be referred to.

It is preferable that the undercoat liquid substantially does not contain a colorant (for example, a pigment).

Specifically, a content of the colorant is preferably less than 1% by mass with respect to the total amount of the undercoat liquid.

[Image Recording Method]

The image recording method according to the embodiment of the present disclosure preferably includes a step of applying the above-described ink onto a substrate by an inkjet recording method (hereinafter, also referred to as "ink applying step") and a step of recording an image by curing the ink applied onto the substrate by irradiation with an active energy ray A (hereinafter, an image recording step).

<Ink Applying Step>

The ink applying step includes applying the above-described ink onto a substrate by an inkjet recording method.

The substrate may be a permeable substrate such as paper, or an impermeable substrate.

In the image recording method according to the embodiment of the present disclosure, since the image is recorded by being irradiated with an active energy ray, even in a case where the substrate is an impermeable substrate, it is easy to ensure adhesiveness between the substrate and the image.

In the present disclosure, the impermeable substrate refers to a substrate having a water absorption rate (% by mass, 24 hr) of less than 0.2 in ASTM D570 which is the ASTM test method.

In the present disclosure, the permeable substrate refers to a substrate having a water absorption rate (% by mass, 24 hr) of 0.2 or more in ASTM D570 which is the ASTM test method.

Examples of the impermeable substrate include glass, quartz, a plastic film, and leather.

Examples of a resin constituting the plastic film include cellulose diacetate, cellulose triacetate, cellulose propionate, cellulose butyrate, cellulose acetate butyrate, cellulose nitrate, an acrylic resin, a chlorinated polyolefin resin, a polyether sulfone resin, polyethylene terephthalate (PET), polyethylene naphthalate, nylon, polyethylene, polystyrene (PS), polypropylene (PP), a polycycloolefin (PC) resin, a polyimide resin, a polycarbonate resin, and polyvinyl acetal.

The plastic film may be a film containing only one of these resins or a film containing two or more of these resins.

Examples of the leather include natural leather (also called "real leather") and synthetic leather (for example, polyvinyl chloride (PVC) leather or polyurethane (PU) leather). For the leather, for example, paragraphs 0163 to 0165 of JP2009-058750A can be referred to.

A thickness of the impermeable substrate is not particularly limited, but is preferably 10 μm to 2,000 μm, more preferably 20 μm to 1,000 μm, still more preferably 30 μm to 500 μm, and particularly preferably 30 μm to 400 μm.

Examples of the permeable substrate include paper and cloth.

Examples of the paper include uncoated paper (for example, high-quality paper or the like), coated paper, paperboard, liner paper used for a corrugated cardboard, and cloth. The paperboard may be provided with a coating layer.

As the permeable substrate, coated paper or a paperboard provided with a coating layer is preferable. The ink slowly permeates into the coated paper or the paperboard provided with a coating layer, so that the metallic lustrousness of an image recorded on the coated paper or the paperboard is likely to be more strongly expressed.

The inkjet recording method is not particularly limited as long as it is a method capable of recording an image, and a known method can be used. Examples of the inkjet recording method include an electric charge control method of ejecting ink by using an electrostatic attraction force; a drop-on-demand method (pressure pulse method) of using a vibration pressure of a piezo element; an acoustic inkjet method of converting an electric signal into an acoustic beam, irradiating ink, and ejecting the ink using a radiation pressure; and a thermal inkjet (Bubble jet (registered trademark)) method of heating ink to form air bubbles and utilizing the generated pressure.

Examples of inkjet heads used in the inkjet recording method include inkjet heads for a shuttle method of using short serial heads that are caused to scan a substrate in a width direction of the substrate so as to perform recording and inkjet heads for a line method of using line heads that each consist of recording elements arranged for the entire area of each side of a substrate.

In the line method, pattern formation can be performed on the entire surface of a substrate by scanning the substrate in a direction perpendicular to a direction in which the recording elements are arranged, and a transport system such as a carriage that scans a short head is unnecessary. In addition, in the line method, complicated scanning control for moving a carriage and a substrate is not necessary, and only a substrate moves. Therefore, the recording speed can be further increased in the line method than in the shuttle method.

A liquid droplet volume of the ink jetted from the inkjet head is preferably 1 pL (picoliter) to 100 pL, more preferably 3 pL to 80 pL, and still more preferably 3 pL to 50 pL.
<Image Recording Step>

The image recording step includes recording an image by curing the ink applied onto the substrate by irradiation with an active energy ray A.

In the image recording step, by irradiating the ink applied onto the substrate with the active energy ray A, the polymerizable compound in an ink film formed of the ink is polymerized to cure the ink film, and as a result, the image is obtained. The active energy ray is preferably ultraviolet rays.

A peak wavelength of the ultraviolet rays is, for example, preferably 200 nm to 405 nm, more preferably 250 nm to 400 nm, and still more preferably 300 nm to 400 nm.

As a light source for the ultraviolet irradiation, a mercury lamp, a gas laser, or a solid-state laser is mainly used, and a mercury lamp, a metal halide lamp, and an ultraviolet fluorescent lamp are widely known light sources. In addition, light emitting diode (UV-LED) or laser diode (UV-LD) is expected as the light source for the ultraviolet irradiation because they are compact, have long service life and high efficiency, and are inexpensive. Among these, a metal halide lamp, a high-pressure mercury lamp, a medium-pressure mercury lamp, a low-pressure mercury lamp, or UV-LED is preferable as the light source for the ultraviolet irradiation.

The image recording method according to the embodiment of the present disclosure may be an aspect in which the content of the photopolymerization initiator in the ink is less than 1% by mass with respect to the total amount of the ink, and the ink is cured by irradiation with an electron beam as the active energy ray A. Since the content of the photopolymerization initiator is less than 1% by mass, elution of the photopolymerization initiator from the image can be further suppressed. Accordingly, the image recording method of this aspect is particularly suitable as a method of manufacturing, for example, an image recorded material for food packaging.

The step of irradiating the ink with the active energy ray A is preferably a step of main-curing the ink film.

Roughly speaking, the main curing means polymerizing substantially all of the polymerizable compounds in the ink film such that the ink film is substantially completely cured.

Specifically, the main curing means curing the ink film by polymerizing the polymerizable compounds in the ink film until a curing rate of the ink film (that is, a polymerization rate of the polymerizable compounds determined by high-performance liquid chromatography) reaches 90% to 100%.

In the present disclosure, the irradiation with the active energy ray A for the main curing may be called "curing exposure", and the active energy ray A for the main curing may be called "curing exposure light".

From the viewpoint of further improving the adhesiveness between the substrate and the image, an illuminance of the active energy ray A as the curing exposure light is preferably 1.0 W/cm$^2$ or more, more preferably 2.0 W/cm$^2$ or more, and still more preferably 4.0 W/cm$^2$ or more.

The upper limit value of the illuminance of the active energy ray A as the curing exposure light is not particularly limited, and is, for example, 10 W/cm$^2$.

From the viewpoint of further improving the adhesiveness between the substrate and the image, irradiation energy (that is, an exposure amount) of the active energy ray A as the curing exposure light is preferably 500 mJ/cm$^2$ or more and more preferably 800 mJ/cm$^2$ or more.

The upper limit value of the exposure amount of the active energy ray A as the curing exposure light is not particularly limited, and is, for example, 2,000 mJ/cm$^2$.

The irradiation with the active energy ray A is preferably performed in an atmosphere at an oxygen concentration of 0.1% by volume or less. As a result, oxygen is inhibited from hindering polymerization, and an image having more excellent adhesiveness with the substrate is obtained.

The atmosphere at an oxygen concentration of 0.1% by volume or less is suitably an atmosphere in the presence of an inert gas (for example, a nitrogen gas, an argon gas, or a helium gas).

It is preferable that the image recording step includes a step of temporarily curing the ink applied onto the substrate by irradiation with an active energy ray P having irradiation energy lower than irradiation energy of the active energy ray A, and a step of curing an ink film formed by the temporary curing of the ink by irradiation with the active energy ray A to record the image. In a case where the image recording step includes the temporary curing step, line quality of the image is further improved.

Roughly speaking, the temporary curing is polymerizing only some of the polymerizable compounds in the ink film.

Specifically, the temporary curing is polymerizing some of the polymerizable compounds in the ink film until the curing rate of the ink film (that is, the polymerization rate of the polymerizable compounds determined by high-performance liquid chromatography; the same is applied hereinafter) reaches approximately less than 90%, so that the ink film is temporarily cured.

The curing rate of the temporarily cured ink film is more preferably 80% or less, still more preferably 70% or less, and even more preferably 50% or less.

The curing rate of the temporarily cured ink film is preferably 10% or more, more preferably 20% or more, and still more preferably 30% or more.

In the present disclosure, the irradiation with the active energy ray P for the temporary curing may be called "pinning exposure", and the active energy ray P for the temporary curing may be called "pinning exposure light".

An illuminance of the active energy ray Pas the pinning exposure light is preferably 0.10 W/cm$^2$ to 0.50 W/cm$^2$, more preferably 0.20 W/cm$^2$ to 0.49 W/cm$^2$, and still more preferably 0.20 W/cm$^2$ to 0.45 W/cm$^2$.

Irradiation energy (that is, an exposure amount) of the active energy ray P as the pinning exposure light is preferably 50 mJ/cm$^2$ to 500 mJ/cm$^2$ and more preferably 100 mJ/cm$^2$ to 300 mJ/cm$^2$.

The image recording method according to the embodiment of the present disclosure may further include, before the ink applying step, a step of forming an undercoat layer by applying an undercoat liquid onto the substrate and temporarily curing the applied undercoat liquid.

In a case of including the step of forming an undercoat layer, the manufactured image recorded material includes the undercoat layer between the substrate and the image.

Preferred aspects of the undercoat liquid (for example, preferred combinations of the ink and the undercoat liquid) are as described above.

The undercoat liquid can be applied using a known method such as a coating method, an immersion method, and an inkjet recording method.

The coating method is performed using, for example, a bar coater, an extrusion coater, an air doctor coater, a blade coater, a rod coater, a knife coater, a squeeze coater, a reverse roll coater, a transfer roll coater, a gravure coater, a kiss roll coater, a cast coater, a spray coater, a curtain coater, or an extrusion coater.

The undercoat liquid is preferably applied to the same region as the ink film formed by the application of the ink or a region wider than the ink film. The undercoat liquid is preferably applied to cover the entirety of the region where the ink film is formed.

From the viewpoint of flexibility of the image to be recorded, a thickness of the undercoat layer formed by the application of the undercoat liquid is preferably 0.5 μm to 6.0 μm and more preferably 2.0 μm to 4.0 μm.

The temporary curing of the undercoat liquid can be performed by the irradiation with an active energy ray, same as in the temporary curing step of temporarily curing the ink.

In this case, preferred aspects of irradiation conditions of the active energy ray are the same as the preferred aspects of the irradiation conditions of the active energy ray P in the step of temporarily curing the ink.

EXAMPLES

Hereinafter, the present disclosure will be described in more detail using Examples. However, the present disclosure is not limited to the following examples as long as it does not exceed the gist of the present invention.

Examples 1 to 13 and Comparative Examples 1 to 5

<Preparation of Metal Particle Dispersion>

A 5.0% by mass solution obtained by dissolving the coating compound (for example, the polymer) described in Tables 1 to 3 in ethyl acetate was applied onto a polyethylene terephthalate (PET) film having a film thickness of 50 μm with a gravure coater. The coating solution was dried to form a polymer layer.

A metal film containing metals described in Tables 1 to 3 was formed on the polymer layer by a vacuum vapor deposition method to obtain a laminate consisting of the PET film, the polymer layer, and the metal film. The laminate was immersed in propylene glycol monomethyl ether (PGME) to dissolve the polymer layer. A miniaturization treatment and a dispersion treatment were performed using an ultrasonic disperser to obtain a metal particle dispersion containing metal particles in which at least a part of a surface was coated with the polymer.

The obtained dispersion was filtered through a SUS mesh filter having an opening of 5 μm, and a solvent was removed using an evaporator or the like or was added to obtain a metal particle dispersion having a predetermined concentration.

In Comparative Example 1, a metal film was formed on the film, the metal film was peeled off using a doctor blade in PGME, and then a miniaturization treatment and a dispersion treatment were performed to obtain metal particles which were not coated with the polymer. In addition, in Comparative Example 4, as the coating compound, fatty acid triglyceride, which is a low-molecular-weight compound, was used instead of the polymer.

<Preparation of Ink>

The above-described metal particle dispersion and other components were mixed to prepare ink, in which the contents of the metal particles, the polymerizable compound, the photopolymerization initiator, the polymerization inhibitor, the organic solvent, and the surfactant were adjusted to the values described in Tables 1 to 3.

Details of the components contained in the ink are as follows.

(Metal Particles)

—Metal—

Indium . . . specific gravity: 7.3

Nickel . . . specific gravity: 8.9

—Coating Compound—

CAB: cellulose acetate butyrate

CAP: cellulose acetate propionate

CA: cellulose acetate

Fatty acid triglyceride (Polymerizable Compound)

IBOA: isobornyl acrylate (product name "SR506", manufactured by Sartomer Company, Inc.)

NVC: N-vinylcaprolactam (product name "NVC", manufactured by BASF SE)

ACMO: acryloylmorpholine (product name "Acryloylmorpholine", manufactured by KJ Chemicals Corporation)

CTFA: cyclic trimethylolpropane formal acrylate (product name "VISCOAT #200", manufactured by OSAKA ORGANIC CHEMICAL INDUSTRY LTD.)

PEA: phenoxyethyl acrylate (product name "SR339", manufactured by Sartomer Company, Inc.)

4-HBA: 4-hydroxybutyl acrylate (product name "4-HBA", manufactured by OSAKA ORGANIC CHEMICAL INDUSTRY LTD.)

ISTA: isostearyl acrylate (product name "ISTA", manufactured by OSAKA ORGANIC CHEMICAL INDUSTRY LTD.)

3MPDDA: 3-methyl-1,5-pentanediol diacrylate (product name "SR341", manufactured by Sartomer Company, Inc.)

DPGDA: dipropylene glycol diacrylate (product name "SR508", manufactured by Sartomer Company, Inc.)

PEGDA400: polyethylene glycol (400) diacrylate (product name "SR344", manufactured by Sartomer Company, Inc.)

TCDDMDA: tricyclodecane dimethanol diacrylate (product name "SR833S", manufactured by Sartomer Company, Inc.)

TMPTA: trimethylolpropane triacrylate (product name "TMPTA", manufactured by OSAKA ORGANIC CHEMICAL INDUSTRY LTD.)

TFEA: 2,2,2-trifluoroethyl acrylate (product name "VIS-COAT 3F", manufactured by OSAKA ORGANIC CHEMICAL INDUSTRY LTD.)

HDDA: 1,6-hexanediol diacrylate (product name "SR238", manufactured by Sartomer Company, Inc.)

(Photopolymerization Initiator)

819: bis(2,4,6-trimethylbenzoyl)phenylphosphine oxide (product name "Omnirad 819", manufactured by IGM Resins B.V.)

TPO-H: 2,4,6-trimethylbenzoyl diphenylphosphine oxide (product name "Omnirad TPO-H", manufactured by IGM Resins B.V.)

2959: 1-[4-(2-hydroxyethoxy)-phenyl]-2-hydroxy-2-methyl-1-propan-1-one (product name "Omnirad 2959", manufactured by IGM Resins B. V.)

184: 1-hydroxycyclohexylphenyl ketone (product name "Omnirad 184", manufactured by IGM Resins B.V.)

(Polymerization Inhibitor)

UV22: quinone-based polymerization inhibitor (product name "IRGASTAB UV22", manufactured by BASF SE)

MEHQ: 4-methoxyphenol (manufactured by Tokyo Chemical Industry Co., Ltd.)

TEMPOL: 2,2,6,6-tetramethyl-4-hydroxypiperidine-1-oxyl (manufactured by Tokyo Chemical Industry Co., Ltd.)

(Organic Solvent)

PGME: propylene glycol monomethyl ether

Butyl acetate (Surfactant)

BYK-378: silicone-based surfactant (manufactured by BYK)

BYK-UV3576: silicone-based surfactant having an acryloyl group (manufactured by BYK)

Using the obtained ink, the presence proportion of the metal particles on the surface of the image was calculated. The calculation method is as follows.

(Presence Proportion of Metal Particles on Surface of Ink Film)

The content of the metal particles in the ink was adjusted to 0.5% by mass. As a diluent, a polymerizable compound having the highest content in the ink was selected.

The solution prepared by adjusting the content of the metal particles in the ink to 0.5% by mass was cured by irradiation with an active energy ray to obtain an ink film having a thickness of 12 μm.

A cross section of the ink film was observed with a scanning electron microscope (SEM) (for example, Nova 200 FIB-SEM manufactured by Thermo Fisher Scientific Inc.) at a magnification of 50,000 times. The number X of metal particles present in the entire cross section of the ink film and the number Y of metal particles present in a region within 100 nm from the surface of the ink film to the inside of the ink film were measured. A proportion of the number Y to the number X was calculated. The calculated value was defined as the presence proportion of the metal particles on the surface of the ink film and classified into the following categories. The categories are shown in Table 1.

A: presence proportion of the metal particles on the surface of the ink film was 70% or more.

B: presence proportion of the metal particles on the surface of the ink film was 50% or more and less than 70%.

C: presence proportion of the metal particles on the surface of the ink film was less than 50%.

<Image Recording Method>

The above-described ink was introduced into a white throttle of a multi-pass (that is, shuttle scan) inkjet printer (product name "Acuity LED 1600R", manufactured by FUJIFILM Corporation). VIEWFUL PET (thickness: 188 μm) was prepared as a substrate.

The ink was jetted on the substrate by a multi-pass method in a form of a solid image having a halftone dot rate of 100% and in a form of a 2-point line image.

The application of the ink was performed under the conditions of 1,200 dot per inch (dpi)×1,200 dpi, 48 passes, and bidirectional printing.

During the image recording, the lamp work of the inkjet printer was set such that the ink applied onto the substrate was irradiated with pinning exposure light (exposure light for temporary curing) as the active energy ray P and with the curing exposure light (exposure light for main curing) as the active energy ray A in this order.

The time from the landing of the ink on the substrate to the irradiation with the pinning exposure light was 0.1 seconds, and the time from the landing of the ink on the substrate to the irradiation with the curing exposure light was 2.0 seconds.

Here, the pinning exposure light was ultraviolet rays having a peak wavelength of 385 nm, and the curing exposure light was ultraviolet rays having a peak wavelength of 385 nm.

The irradiation energy of the pinning exposure light was 200 mJ/cm², and the irradiation energy of the curing exposure light was 1,000 mJ/cm².

In Examples and Comparative Examples including, as the photopolymerization initiator, Omnirad 2959 and Omnirad 184, an external metal halide light source was used as a curing light source.

The irradiation of the ink on the substrate with the curing exposure light was performed in a nitrogen purge atmosphere (specifically, in an atmosphere in which the oxygen concentration was 0.1% by volume or less and the nitrogen concentration was 99.9% by volume or more).

Under the above conditions, the ink applied onto the substrate was subjected to temporary curing and main curing in this order to record an image (a solid image and a line image), thereby obtaining an image recorded material.

Metallic lustrousness, image quality, temporal stability, lustrousness after the passage of time, and image quality after the passage of time were evaluated using the obtained image recorded material. The evaluation methods were as follows.

(Metallic Lustrousness)

Using a glossmeter (product name "micro-gloss microtri-gloss", manufactured by BYK-Gardner), a degree of 20° lustrousness of the solid image in the image recorded material was measured. As the degree of 20° lustrousness was higher, the metallic lustrousness was more excellent. The evaluation standard was as follows.

A: degree of 20° lustrousness was 500 or more.

B: degree of 20° lustrousness was 200 or more and less than 500.

C: degree of 20° lustrousness was 100 or more and less than 200.

D: degree of 20° lustrousness was less than 100.

(Image Quality)

Using an image evaluation system (product name "Dot analyzer DA6000", manufactured by Oji Scientific Instruments), ruggedness of the line image in the image recorded material was measured. As the ruggedness was smaller, the image quality was more excellent. The evaluation standard was as follows.

A: ruggedness of the line image was less than 2.0.

B: ruggedness of the line image was 2.0 or more and less than 4.0.

C: ruggedness of the line image was 4.0 or more and less than 6.0.

D: ruggedness of the line image was 6.0 or more and less than 8.0.

E: ruggedness of the line image was 8.0 or more.

(Temporal Stability)

A viscosity of the ink immediately after the preparation (that is, before the test) and a viscosity of the ink 14 days after the preparation (that is, after the test) were measured, and temporal stability of the ink was evaluated based on the increase rate of the viscosity. First, immediately after preparing the ink, the viscosity thereof at 25° C. was measured using an E-type viscometer (product name "RE-85L", manufactured by TOKI SANGYO CO., LTD.). A brown vial was filled with 100 mL of the ink and allowed to stand at 60° C. for 14 days. After 14 days, the viscosity of the ink was measured under the same conditions as those immediately after the preparation of the ink. The increase rate of the viscosity was calculated by the following expression. The evaluation standard was as follows.

Increase rate (%)={(Viscosity after test−Viscosity before test)/Viscosity before test}×100

A: increase rate was less than 5%.

B: increase rate was 5% or more and less than 10%.

C: increase rate was 10% or more and less than 20%.

D: increase rate was 20% or more.

(Lustrousness after Passage of Time)

Using an image recorded material produced using an ink 2 days after the preparation, the evaluation was performed by the same method as the method for evaluating the metallic lustrousness described above. The evaluation standards were the same as those for the metallic lustrousness.

(Image Quality after Passage of Time)

Using an image recorded material produced using an ink 2 days after the preparation, the evaluation was performed by the same method as the method for evaluating the image quality described above. The evaluation standards were the same as those for the image quality.

The evaluation results are shown in Tables 1 to 3. In Tables 1 to 3, the "Presence proportion of metal particles on surface of ink film" means a proportion of metal particles present in a region within 100 nm from the surface of the ink film to the inside of the ink film in the cross section of the ink film obtained by curing a solution prepared by adjusting the content of the metal particles in the ink to 0.5% by mass.

TABLE 1

| | | Example 1 | Example 2 | Example 3 | Example 4 | Example 5 | Example 6 |
|---|---|---|---|---|---|---|---|
| Metal particles | Metal | In | In | In | In | In | In |
| | Coating compound | CAB | CAB | CAB | CAB | CAB | CAB |
| | Specific gravity | 7.3 | 7.3 | 7.3 | 7.3 | 7.3 | 7.3 |
| | Average particle diameter (μm) | 0.2 | 0.2 | 0.2 | 0.2 | 0.2 | 0.2 |
| | Content (% by mass) | 3 | 3 | 2 | 1.5 | 3 | 1 |
| Polymerizable compound | IBOA | — | — | — | — | 17 | — |
| | NVC | — | — | — | 10 | — | — |
| | ACMO | — | — | — | — | — | 20 |
| | CTFA | 20 | 30 | 10 | — | 10 | — |
| | PEA | — | — | 12 | — | — | 20 |
| | 4-HBA | — | — | — | 20 | — | — |
| | ISTA | — | — | — | — | 10 | — |
| | 3MPDDA | — | 42 | — | 45 | 27 | — |
| | DPGDA | 52 | — | 52 | — | — | 33 |
| | PEGDA400 | 10 | — | 10 | 10 | 10 | 10 |
| | TCDDMDA | — | 10 | — | — | — | — |
| | TMPTA | — | — | — | — | 5 | — |
| Photopolymerization initiator | 819 | 4 | 4 | 4 | 4 | 4 | 4 |
| | TPO-H | 6 | 6 | 2 | 6 | 2 | 6 |
| | 2959 | — | — | 2 | — | — | — |
| | 184 | — | — | 2 | — | — | — |
| Polymerization inhibitor | UV22 | 1.5 | 1.5 | 1.5 | 1.5 | 1.5 | 1.5 |
| | MEHQ | 0.5 | 0.5 | 0.5 | 0.5 | 0.5 | 0.5 |
| Organic solvent | PGME | 3 | 3 | — | 1.5 | 10 | 4 |
| | Butyl acetate | — | — | 2 | — | — | — |

TABLE 1-continued

| | | Example 1 | Example 2 | Example 3 | Example 4 | Example 5 | Example 6 |
|---|---|---|---|---|---|---|---|
| | Presence proportion of metal particles on surface of ink film | A | A | A | A | A | A |
| | Surface tension of ink (mN/m) | 34 | 34 | 36 | 37 | 31 | 39 |
| Evaluation | Metallic glossiness | A | A | A | A | B | A |
| | Image quality | A | A | A | A | A | B |
| | Temporal stability | A | A | A | A | A | A |
| | Lustrousness after passage of time | A | A | A | A | B | A |
| | Image quality after passage of time | A | A | A | A | A | B |

TABLE 2

| | | Example 7 | Example 8 | Example 10 | Example 11 | Example 12 | Example 13 |
|---|---|---|---|---|---|---|---|
| Metal particles | Metal | In | Ni | In | In | In | In |
| | Coating compound | CAB | CAB | CAP | CA | CAB | CAB |
| | Specific gravity | 7.3 | 8.9 | 7.3 | 7.3 | 7.3 | 7.3 |
| | Average particle diameter (μm) | 0.2 | 0.5 | 0.2 | 0.2 | 0.2 | 0.2 |
| | Content (% by mass) | 3 | 3 | 2 | 2 | 4 | 3 |
| Polymerizable compound | ACMO | 20 | — | — | — | — | — |
| | CTFA | — | 30 | 10 | 10 | 20 | 20 |
| | PEA | 37 | — | 12 | 12 | — | — |
| | 3MPDDA | — | 42 | — | — | — | — |
| | DPGDA | 15 | — | 52 | 52 | 52 | 52.8 |
| | PEGDA400 | 10 | — | 10 | 10 | 9.5 | 10 |
| | TCDDMDA | — | 10 | — | — | — | — |
| Photopolymerization initiator | 819 | 4 | 4 | 4 | 4 | 4 | 4 |
| | TPO-H | 6 | 6 | 2 | 2 | 6 | 6 |
| | 2959 | — | — | 2 | 2 | — | — |
| | 184 | — | — | 2 | 2 | — | — |
| Polymerization inhibitor | UV22 | 1.5 | 1.5 | 1.5 | 1.5 | 0.5 | 1 |
| | MEHQ | 0.5 | 0.5 | 0.5 | 0.5 | — | — |
| | TEMPOL | — | — | — | — | — | 0.2 |
| Organic solvent | PGME | 3 | 3 | — | — | 4 | 3 |
| | Butyl acetate | — | — | 2 | 2 | — | — |
| | Presence proportion of metal particles on surface of ink film | A | B | A | A | A | A |
| | Surface tension of ink (mN/m) | 41 | 34 | 36 | 36 | 34 | 32 |
| Evaluation | Metallic glossiness | A | B | A | A | A | A |
| | Image quality | B | A | A | A | A | A |
| | Temporal stability | A | A | A | A | B | A |
| | Lustrousness after passage of time | A | B | A | A | B | A |
| | Image quality after passage of time | C | B | A | A | B | A |

TABLE 3

| | | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| Metal particles | Metal | In | In | In | In | Ni | In | In | In |
| | Coating compound | None | CAB | CAB | Fatty acid triglyceride | CAB | CAB | CAB | CAB |
| | Specific gravity | 7.3 | 7.3 | 7.3 | 7.3 | 8.9 | 7.3 | 7.3 | 7.3 |
| | Average particle diameter (μm) | 0.2 | 0.2 | 0.2 | 0.2 | 1.2 | 0.2 | 0.2 | 0.2 |
| | Content (% by mass) | 3 | 3 | 1 | 3 | 3 | 2 | 3.2 | 10.4 |
| Polymerizable compound | CTFA | 20 | — | 20 | 20 | 20 | 10 | — | — |
| | ISTA | — | 30 | — | — | — | — | — | — |
| | PEA | — | — | — | — | — | 14 | — | 45.26 |
| | 3MPDDA | — | 41 | — | — | — | — | — | — |

TABLE 3-continued

| | | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| | DPGDA | 52 | — | 54 | 52 | 52 | 52 | — | — |
| | PEGDA400 | 10 | — | 10 | 10 | 10 | 10 | — | — |
| | TCDDMDA | — | 9 | — | — | — | — | — | — |
| | HDDA | — | — | — | — | — | — | 73.4 | — |
| | TMPTA | — | — | — | — | — | — | 7.3 | 15.56 |
| Photopolymerization initiator | 819 | 4 | 4 | 4 | 4 | 4 | 4 | — | — |
| | TPO-H | 6 | 2 | 4 | 6 | 6 | 2 | — | — |
| | 2959 | 1 | 2 | 1 | — | 1 | 2 | — | — |
| | 184 | 1 | 4 | 1 | — | — | 2 | 3.2 | 3.89 |
| Polymerization inhibitor | UV22 | 1.5 | 1.5 | 1.5 | 1.5 | 1.5 | 1 | — | — |
| | MEHQ | 0.5 | 0.5 | 0.5 | 0.5 | 0.5 | — | — | — |
| Organic solvent | PGME | 3 | 3 | 4 | 3 | 3 | — | 12.9 | 20 |
| | Butyl acetate | — | — | — | — | — | 2 | — | 3.89 |
| Surfactant | BYK-378 | — | — | 1 | — | — | — | — | — |
| | BYK-UV3576 | — | — | — | — | — | — | — | 1 |
| Presence proportion of metal particles on surface of ink film | | C | A | B | C | C | A | A | A |
| Surface tension of ink (mN/m) | | 34 | 29 | 26 | 34 | 34 | 34 | 33 | 29 |
| Evaluation | Metallic glossiness | D | D | D | D | D | C | C | D |
| | Image quality | A | A | A | A | A | B | C | D |
| | Temporal stability | D | A | A | D | B | C | D | D |
| | Lustrousness after passage of time | Cannot be evaluated | D | D | Cannot be evaluated | D | D | Cannot be evaluated | Cannot be evaluated |
| | Image quality after passage of time | Cannot be evaluated | A | A | Cannot be evaluated | D | D | Cannot be evaluated | Cannot be evaluated |

As shown in Tables 1 and 2, since the inks of Examples 1 to 13 contained the metal particles, the polymerizable compound, and the polymerization inhibitor, in which the metal particles had a specific gravity of 3 or more, in the cross section of an ink film having a thickness of 1 μm or more, which was obtained by curing a solution prepared by adjusting the content of the metal particles in the active energy ray-curable inkjet ink to 0.5% by mass, 50% by mass or more of the total mass of the metal particles was present in the region within 100 nm from the surface of the ink film to the inside of the ink film, and the surface tension of the ink was 30 mN/m or more, it was found that the metallic lustrousness was excellent.

On the other hand, as shown in Table 3, in Comparative Examples 1, 4, and 5, since the presence proportion of the metal particles on the surface of the image was less than 50% by mass, it was found that the metallic lustrousness was deteriorated.

In addition, in Comparative Examples 2, 3, and 8, since the surface tension of the ink was less than 30 mN/m, it was found that the metallic lustrousness was deteriorated.

Furthermore, in Comparative Examples 6 to 8, since the ink did not contain the polymerization inhibitor, it was found that the metallic lustrousness was deteriorated.

Example 101

<Preparation of Undercoat Liquid>

An undercoat liquid was prepared by mixing the following components.

NVC . . . 20% by mass
CTFA . . . 73.4% by mass
Omnirad 819 . . . 2.8% by mass
Omnirad TPO-H . . . 2.8% by mass
ITX: isopropylthioxanthone (product name "ITX", manufactured by Lambson Ltd.) . . . 0.5% by mass
FLORSTAB UV12 (manufactured by Kromachem Ltd) . . . 0.5% by mass <Image Recording Method>

Image recording was performed using the prepared undercoat liquid and the ink prepared in Example 1.

With a multi-pass (that is, shuttle scan) inkjet printer (product name "Acuity LED 1600R", manufactured by FUJIFILM Corporation), the undercoat liquid was introduced into a white throttle, and the ink was introduced into a clear throttle. As a substrate, printing paper (trade name "ARAVEAL") was prepared.

The undercoat liquid was jetted on the substrate by a multi-pass method in a form of a solid image having a halftone dot rate of 100%.

The application of the undercoat liquid was performed under the conditions of 1,200 dot per inch (dpi)×1,200 dpi, 48 passes, and bidirectional printing. The undercoat liquid applied onto the substrate was irradiated with curing exposure light (exposure light for main curing).

The time from the landing of the undercoat liquid on the substrate to the irradiation with the curing exposure light was 0.1 seconds.

Next, the ink was jetted on the substrate which had been coated with the undercoat liquid by a multi-pass method in a form of a solid image having a halftone dot rate of 100% and in a form of a 2-point line image.

The application of the ink was performed under the conditions of 1,200 dot per inch (dpi)×1,200 dpi, 48 passes, and bidirectional printing.

The lamp work of the inkjet printer was set such that the ink applied onto the substrate was irradiated with pinning exposure light (exposure light for temporary curing) as the active energy ray P and with the curing exposure light (exposure light for main curing) as the active energy ray A in this order.

The time from the landing of the ink on the substrate to the irradiation with the pinning exposure light was 0.1 seconds, and the time from the landing of the ink on the substrate to the irradiation with the curing exposure light was 2.0 seconds.

Here, the pinning exposure light was ultraviolet rays having a peak wavelength of 385 nm, and the curing exposure light was ultraviolet rays having a peak wavelength of 385 nm.

The irradiation energy of the pinning exposure light was 200 mJ/cm$^2$, and the irradiation energy of the curing exposure light was 1,000 mJ/cm$^2$.

The irradiation of the ink on the substrate with the curing exposure light was performed in a nitrogen purge atmosphere (specifically, in an atmosphere in which the oxygen concentration was 0.1% by volume or less and the nitrogen concentration was 99.9% by volume or more).

An image recorded material was obtained under the above conditions.

Example 102

Image recording was performed using the undercoat liquid prepared in Example 101 and the ink prepared in Example 1.

With a multi-pass (that is, shuttle scan) inkjet printer (product name "Acuity LED 1600R", manufactured by FUJIFILM Corporation), the undercoat liquid was introduced into a white throttle, and the ink was introduced into a clear throttle. As a substrate, printing paper (trade name "KASANE") was prepared.

The undercoat liquid was jetted on the substrate by a multi-pass method in a form of a solid image having a halftone dot rate of 100%.

The application of the undercoat liquid was performed under the conditions of 1,200 dot per inch (dpi)×1,200 dpi, 48 passes, and bidirectional printing. The undercoat liquid applied onto the substrate was irradiated with pinning exposure light (exposure light for temporary curing) and curing exposure light (exposure light for main curing).

The time from the landing of the undercoat liquid on the substrate to the irradiation with the pinning exposure light was 0.1 seconds, and the time from the landing of the undercoat liquid on the substrate to the irradiation with the curing exposure light was 2.0 seconds.

The step of jetting the ink onto the substrate which had been coated with the undercoat liquid and exposing the ink was performed by the same method as in Example 101.

An image recorded material was obtained under the above conditions.

Example 103

Image recording was performed using the undercoat liquid prepared in Example 101 and the ink prepared in Example 1.

With a multi-pass (that is, shuttle scan) inkjet printer (product name "Acuity LED 1600R", manufactured by FUJIFILM Corporation), the undercoat liquid was introduced into a white throttle, and the ink was introduced into a clear throttle. As a substrate, synthetic leather (trade name "CAPPUCCINO") was prepared.

The undercoat liquid was jetted on the substrate by a multi-pass method in a form of a solid image having a halftone dot rate of 100%.

The application of the undercoat liquid was performed under the conditions of 1,200 dot per inch (dpi)×1,200 dpi, 48 passes, and bidirectional printing. The undercoat liquid applied onto the substrate was irradiated with pinning exposure light (exposure light for temporary curing).

The time from the landing of the undercoat liquid on the substrate to the irradiation with the pinning exposure light was 0.1 seconds.

The step of jetting the ink onto the substrate which had been coated with the undercoat liquid and exposing the ink was performed by the same method as in Example 101.

An image recorded material was obtained under the above conditions.

Using the obtained image recorded material, the metallic lustrousness and the image quality were evaluated by the same methods as in Example 1. In all of Examples 101 to 103, the evaluation results of metallic lustrousness and image quality were A.

The disclosure of Japanese Patent Application No. 2021-146365 filed on Sep. 8, 2021 is incorporated in the present specification by reference. In addition, all documents, patent applications, and technical standards described in the present specification are incorporated herein by reference to the same extent as in a case of being specifically and individually noted that individual documents, patent applications, and technical standards are incorporated by reference.

What is claimed is:

1. An active energy ray-curable inkjet ink comprising:
   metal particles;
   a polymerizable compound; and
   a polymerization inhibitor,
   wherein the metal particles have a specific gravity of 3 or more,
   in a cross section of an ink film having a thickness of 1 μm or more, which is obtained by curing a solution prepared by adjusting a content of the metal particles in the active energy ray-curable inkjet ink to 0.5% by mass, 50% by mass or more of a total mass of the metal particles is present in a region within 100 nm from a surface of the ink film toward an inside of the ink film, and
   a surface tension of the active energy ray-curable inkjet ink is 30 mN/m or more.

2. The active energy ray-curable inkjet ink according to claim 1,
   wherein at least a part of a surface of the metal particles is coated with at least one polymer selected from the group consisting of cellulose acetate butyrate, cellulose acetate propionate, and cellulose acetate.

3. The active energy ray-curable inkjet ink according to claim 1,
   wherein, in the cross section, 70% by mass or more of the total mass of the metal particles is present in the region within 100 nm from the surface of the ink film toward the inside of the ink film.

4. The active energy ray-curable inkjet ink according to claim 1,
   wherein the metal particles comprise indium.

5. The active energy ray-curable inkjet ink according to claim 1,
   wherein an average particle diameter of the metal particles is from 0.05 μm to 0.5 μm.

6. The active energy ray-curable inkjet ink according to claim 1,
   wherein the metal particles have an outline in which a straight line and a curve are joined to each other in a plan view.

7. The active energy ray-curable inkjet ink according to claim 1,
   wherein the surface tension is from 30 mN/m to 40 mN/m.

8. The active energy ray-curable inkjet ink according to claim 1, wherein the surface tension is from 32 mN/m to 38 mN/m.

9. The active energy ray-curable inkjet ink according to claim 1, wherein the active energy ray-curable inkjet ink comprises no surfactant, or a content of the surfactant is less than 0.01% by mass.

10. An image recording method using the active energy ray-curable inkjet ink according to claim 1, the image recording method comprising:

applying the active energy ray-curable inkjet ink onto a substrate by an inkjet recording method; and recording an image by curing the active energy ray-curable inkjet ink applied onto the substrate by irradiation with an active energy ray A.

11. The image recording method according to claim 10, wherein the recording the image includes temporarily curing the active energy ray-curable inkjet ink applied onto the substrate by irradiation with an active energy ray P having a lower irradiation energy than an irradiation energy of the active energy ray A, and curing an ink film formed by the temporary curing of the active energy ray-curable inkjet ink by irradiation with the active energy ray A to record the image.

\* \* \* \* \*